INVENTOR.
THOMAS A. PATCHELL

BY Arthur H. Swanson

ATTORNEY.

Oct. 6, 1959 T. A. PATCHELL 2,907,932

PHASE DISCRIMINATING APPARATUS

Filed Aug. 16, 1954 2 Sheets-Sheet 2

INVENTOR.
THOMAS A. PATCHELL

BY Arthur H. Swanson

ATTORNEY.

United States Patent Office 2,907,932

Patented Oct. 6, 1959

2,907,932

PHASE DISCRIMINATING APPARATUS

Thomas A. Patchell, Wayne, Pa., assignor to Minneapolis-Honeywell Regulator Company, Minneapolis, Minn., a corporation of Delaware Application August 16, 1954, Serial No. 450,191

6 Claims. (Cl. 317—148.5)

A general object of the present invention is to provide new and improved phase discriminating apparatus. More specifically, the present invention is concerned with phase discriminating circuits which employ transistors as phase sensitive elements.

Phase discriminating circuits are commonly employed in self balancing measuring and control apparatus to initiate corrective rebalancing action in response to a control signal of one phase or the opposite phase with respect to a reference signal. In such applications, these circuits generally energize motion producing elements such as relays, which require substantial amounts of current for their operation. The introduction of junction type transistors with their increased power handling capacities has made the use of transistors in phase discriminating circuits practical.

It is therefore a specific object of the present invention to provide new and improved phase discriminating apparatus utilizing junction type transistors for operating relays.

A further object of the present invention is to utilize diodes connected in series with the transistor collector circuits as additional control elements.

The effect of an increase in temperature upon transistors is particularly manifested by an increase in the collector current for zero emitter current. Depending upon the circuit configuration and circuit parameters employed, this increase in collector current for zero emitter current may appear multiplied several times in the collector current. When transistors are utilized in control circuits, the problem of temperature stabilization is extremely important, for an increase in collector current caused solely by an increase in temperature could initiate an unsignalled relay operation.

It is therefore a still further object of the present invention to provide a new and improved transistor phase discriminating apparatus which is temperature stabilized.

Another object of the present invention is to provide a new and improved transistor phase discriminating apparatus in which temperature stabilization is accomplished by biasing the transistor base so as to drive the collector current to the value of collector current for zero emitter current.

Still another object of the present invention is to provide new and improved phase discriminating circuits which employ complementary symmetry to achieve the circuit operation necessary for selective relay action.

The various features of novelty which characterize this invention are pointed out with particularity in the claims annexed to and forming a part of this specification. For a better understanding of this invention, its advantages, and the specific objects obtained with its use, reference should be had to the accompanying drawings and descriptive matter in which are illustrated and described preferred embodiments of this invention.

Figure 1:
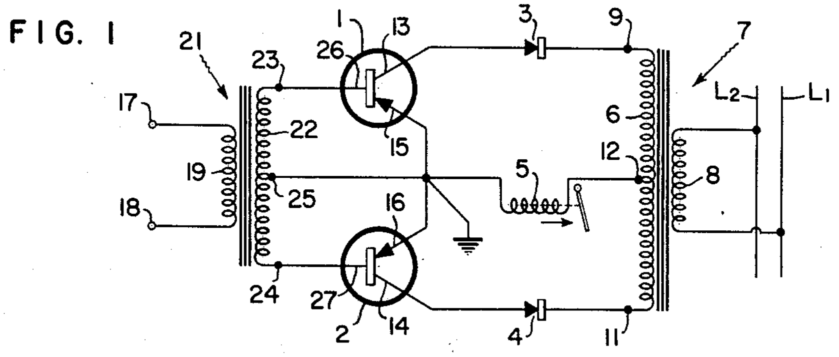
Fig. 1 is a circuit diagram of an embodiment of the present invention designed to operate a relay in accordance with the phase relationship between a control signal and a reference voltage.

Referring now to Fig. 1, the transistors 1 and 2 and the diodes 3 and 4 are employed to control the current flow through the relay 5 in response to the phase relationship between the control signal and a reference voltage. The transistors 1 and 2 are junction type transistors having the usual emitter, collector and base electrodes. The reference voltage in this figure is a voltage across the alternating current conductors $L_1$ and $L_2$. Generally, the conductors $L_1$ and $L_2$ represent a primary power source having suitable voltage and frequency characteristics. This voltage is introduced into the circuit across the secondary winding 6 of transformer 7 having its primary winding 8 connected across the conductors $L_1$ and $L_2$. The secondary winding 6 of the transformer 7 has end terminals 9 and 11 and a center tap 12. The collector 13 of the transistor 1 is connected through the diode 3 to the end terminal 9 of the secondary winding 6 and the collector 14 of the transistor 2 is connected through the diode 4 to the end terminal 11 of the secondary winding 6. The center tap 12 of the secondary winding 6 is connected through the relay 5 to the emitter 15 of the transistor 1 and the emitter 16 of the transistor 2 which are connected together and to ground. The control signal is applied to this circuit across the input terminals 17 and 18 which are the end terminals of the primary winding 19 of the input transformer 21. The input transformer 21 has a secondary winding 22 which has end terminals 23 and 24 and a center tap 25. The base 26 of the transistor 1 is connected to the end terminal 23 of the secondary winding 22 and the base 27 of the transistor 2 is connected to the end terminal 24 of the secondary winding 22. The emitters 15 and 16 of the transistors 1 and 2, respectively, are connected to the center tap 25 of the secondary winding 22.

In considering the operation of the circuit shown in Fig. 1, the control signal applied to the circuit across the input terminals 17 and 18, will be considered to be in phase with the reference voltage when the end terminal 23 of the secondary winding 22 of the input transformer 21 has the same instantaneous polarity as the end terminal 9 of the secondary winding 6 of the transformer 7. This phase discriminating circuit can be regarded as comprising two similar control circuits each operative to control the operation of the relay 5 during a respective half cycle of the reference voltage. These two circuits are energized 180° out of phase with respect to each other by the reference voltage. Similarly, these two circuits are controlled 180° out of phase with respect to each other by the control signal. The control elements of one of these two circuits are the transistor 1 and the diode 3 and the control elements of the other of these two circuits are the transistor 2 and the diode 4.

In the absence of a control signal, both of these two circuits are operative to prevent an appreciable amount of current from flowing through the relay 5. During the first half cycle the reference voltage under consideration, the end terminal 9 of the secondary winding 6 of the transformer 7 will be positive with respect to the center tap 12 and the end terminal 11 of the secondary winding 6 will be negative with respect to the center tap 12. During this half cycle of the reference voltage very little current will flow in the control circuit including the diode 3 because the direction of that current flow is in the direction of the high impedance of that diode. During this same half cycle very little current will flow in the control circuit including the diode 4 because of the high impedance of the collector circuit of the transistor 2. During the next half cycle of the reference voltage the opposite conditions exist. During that half cycle the end terminal 11 of the secondary winding 6 is positive with respect to the center tap 12 and the end terminal 9 of the secondary winding 6 is negative with respect to the center tap 12. During this half cycle, very little current will flow in the control circuit including the diode 4 because the direction of that current flow is in the high impedance direction of that diode. During this same half cycle, very little current will flow in the control circuit including the diode 3 because of the high impedance of the collector circuit of the transistor 1.

If a control signal in phase with the reference voltage is applied to the input terminals 17 and 18, the relay 5 will be energized during both half cycles of the reference voltage. During the first half cycle of the reference voltage, the end terminal 23 of the secondary winding 22 of the input transformer 21 will be positive with respect to the center tap 25 and the end terminal 24 of the secondary winding 22 will be negative with respect to the center tap 25. During this half cycle base current will flow in the transistor 2 reducing the impedance of its collector circuit. This permits a relatively large amount of current to flow from the center tap 12 of the secondary winding 6 through the relay 5, through the emitter collector circuit of the transistor 2 through the diode 4 to the end terminal 11 of the secondary winding 6 of the transformer 7. During the next half cycle of the reference voltage, the end terminal 24 of the secondary winding 22 of the input transformer 21 will be positive with respect to the center tap terminal 25 and the end terminal 23 will be negative with respect to the center tap 25. Thus, during this half cycle, base current will flow in the transistor 1 reducing the impedance of its collector circuit. This permits a relatively large amount of current to flow from the center tap 12 of the secondary winding 6 through the relay 5, through the emitter collector circuit of the transistor 1, through the diode 3 to the end terminal 9 of the secondary winding 6. Hence, if the control signal is in phase with the reference voltage, the relay 5 is energized by a pulsating unidirectional current during both half cycles of the reference voltage.

If a control signal 180° out of phase with the reference voltage is applied across the input terminals 17 and 18, the relay 5 will not be energized on either half cycle of the reference voltage. During the first half cycle of the reference voltage, the end terminal 23 of the secondary winding 22 of the input transformer 21 will be negative with respect to the center tap 25 and the end terminal 24 of the secondary winding 22 will be positive with respect to the center tap 25. During this half cycle, base current will flow in the transistor 1 but it will have no effect since the direction of collector current flow will be in the high impedance direction of the diode 3. During the next half cycle of the reference voltage, the end terminal 24 of the secondary winding 22 of the transistor 21 will be negative with respect to the center tap terminal 25 and the end terminal 23 of the secondary winding 22 of the transformer 21 will be positive. During this half cycle base current will flow in the transistor 2 but it will have no effect since the direction of collector current flow will be in the direction of the high impedance of the diode 4. Thus, the circuit shown in Fig. 1 will operate the relay 5 only when the control signal is in phase with the reference voltage.

Figure 2:
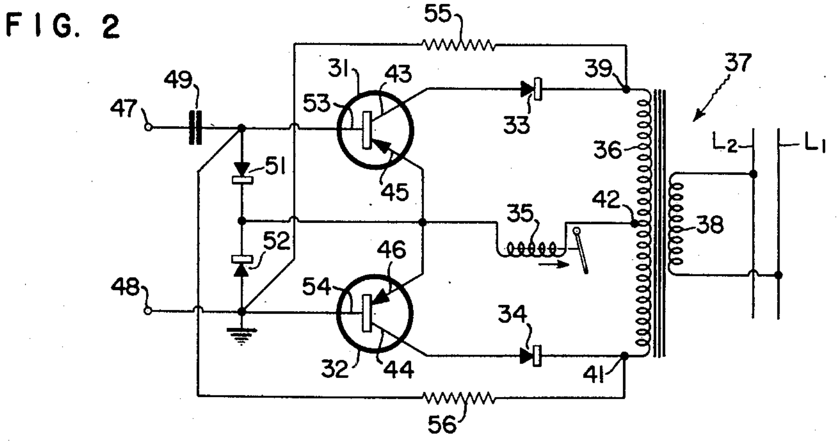
Fig. 2 is a circuit diagram of a modification of the embodiment of the present invention shown in Fig. 1 which modification is temperature stabilized.

Referring now to Fig. 2, there is shown a temperature stabilized modification of the embodiments of the present invention shown in Fig. 1. In this circuit the transistors 31 and 32 and the diodes 33 and 34 are employed to control current flow through the relay 35. The reference voltage is the voltage across the conductors $L_1$ and $L_2$ which is applied to the circuit by means of the transformer 37 which has its primary winding 38 connected across the conductors $L_1$ and $L_2$. The transformer 37 has a secondary winding 36 with end terminals 39 and 41 and a center tap terminal 42. The collector 43 of the transistor 31 is connected through the diode 33 to the end terminal 39 to the secondary winding 36. Similarly, the collector 44 of the transistor 32 is connected through the diode 34 to the end terminal 41 of a secondary winding 36. The center tap 42 of the secondary winding 36 is connected through the relay 35 to the emitter 45 of a transistor 31 and the emitter 46 of the transistor 32 which are connected together. The control signal is applied to this circuit across the input terminals 47 and 48. The input terminal 47 is connected through the coupling condenser 49 to the base 53 of the transistor 31 and the input terminal 48 is connected to ground and to the base 54 of the transistor 32. The diodes 51 and 52 are connected in series across the base 53 and the base 54 of the transistors 31 and 32 respectively. The junction of the diodes 51 and 52 is connected to the junctions of the emitters 45 and 46 of the transistors 31 and 32 respectively. The diodes 51 and 52 and the coupling condenser 49 eliminate the use of an input transformer. The base 53 of the transistor 31 is connected through the resistance 56 to the end terminal 41 of the secondary winding 36 of the transformer 37 and similarly, the base 54 of the transistor 32 is connected through the resistance 55 to the end terminal 39 of the secondary winding 36.

The operation of the circuit shown in Fig. 2 is identical to the operation of the circuit shown in Fig. 1 with the exception that the input transformer has been eliminated by the use of the coupling condenser 49 and the diodes 51 and 52. The diodes 51 and 52 serve to route the input signal to one or the other of the transistors 31 or 32 depending upon the polarity of the input signal. The resistors 55 and 56 connecting the respective bases of the transistors 31 and 32 to the end terminals 39 and 41 of the secondary winding 36 of the transformer 37 provide temperature stabilization for the circuit.

The effect of temperature upon the transistor is particularly manifested by an increase in the collector current for zero emitter current. Depending upon the circuit configuration and circuit parameters employed, this increase in collector current for zero emitter current may appear multiplied several times in the collector current. If no method of temperature stabilization is employed, the no signal relay current in the phase discriminating circuit just described may be considerable at high temperatures. As a result, it would be necessary to make the minimum operating current of the relay greater than the no signal relay current in order to prevent unsignalled relay operation. Since at high temperatures, the no signal relay current may approach or even in extreme cases reach the total current available from the transistors, only a small margin of current is available to operate the relay. The method of stabilization employed in the circuit shown in Fig. 2 is that of biasing the base of each transistor so that the value of its collector current is driven to the value of collector current for zero emitter current. While the value of collector current for zero emitter current increases with an increase in temperature, its increase, depending upon the circuit employed, may be several times less than an increase in the collector current when no biasing is present. While this method of biasing necessitates an increase in the gain of the amplifier so the bias can be over driven, it is of small importance compared to the achieving of a greater power output in the phase discriminating stage. Since, in this circuit, each transistor is operative to control the relay only during one half cycle of the reference voltage it is necessary to apply the correct bias only during that half cycle. Since the proper polarity of this bias voltage is opposite to that applied to the collector of the transistor during the half cycle which it conducts, it may be obtained from the half of the reference voltage transformer secondary winding which is energizing the other transistor 180° out of phase with the transistor under consideration. The resistors 55 and 56 are selected so as to provide a suitable value of a bias current. It should be understood that in lieu of the method of biasing shown, that any suitable source of positive voltage could be employed to achieve the desired temperature stable operation.

Figure 3:
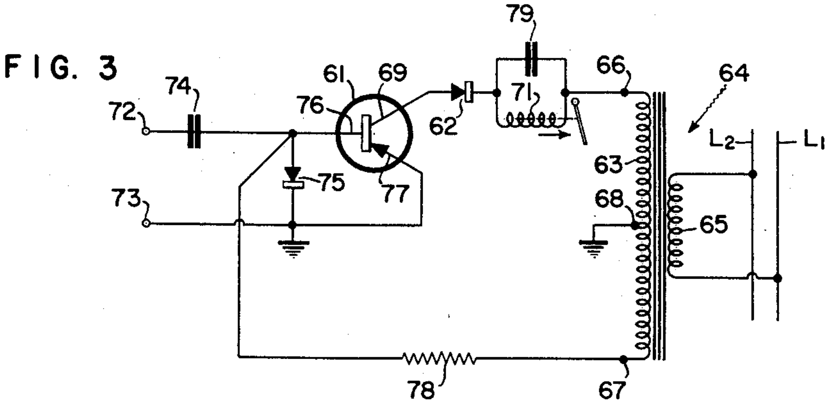
Fig. 3 is a circuit diagram of a simplified temperature stabilized embodiment of the present invention in which a single transistor is employed to operate the relay.

Referring now to Fig. 3, there is shown a circuit diagram of a modification of the present invention in which a single transistor is employed to control the operation of the relay. In this circuit, the transistor 61 and the diode 62 are the control elements. The reference voltage for this circuit is the voltage across the conductors $L_1$ and $L_2$, which is introduced into the circuit across the secondary winding 63 of the transformer 64 which has its primary winding 65 connected across the conductors $L_1$ and $L_2$. The secondary winding 63 of the transformer 64 has end terminals 66 and 67 and a tap 68. The collector 69 and the transistor 61 is connected through the diode 62 and the relay 71 to the end terminal 66 of the secondary winding 63 of the transformer 64. The input portion of this circuit includes the input terminals 72 and 73, the coupling condenser 74, and the diode 75. The input terminal 72 is connected through the coupling condenser 74 to the base 76 of the transistor 61. The input terminal 73 is connected to the emitter 77 of the transistor 61 and to ground. The diode 75 is connected between the base 76 and the emitter 77 of the transistor 61. The tap 68 on the secondary winding 63 of the transformer 64 is also connected to ground to complete a series circuit between the emitter 77 and collector 69 of the transistor 61. The end terminal 67 of the secondary winding 63 of the transformer 64 is connected through the resistor 78 to the base 76 of the transistor 61, and is operative when so connected, to supply temperature compensating bias to the transistor 61. The condenser 79 is connected across the relay 71 to prevent relay chatter.

Operation of the circuit shown in Fig. 3 is identical to the operation of half the circuit shown in Fig. 2 and is thus operative to provide a half cycle energization of the relay 71 if the control signal is in phase with the reference voltage.

In considering the operation of this circuit, the control signal, applied to the circuit across the input terminals 72 and 73, will be considered to be in phase with the reference voltage when the input terminal 72 has the same instantaneous polarity as the end terminal 66 of the secondary winding 63 of the transformer 64. In the absence of a control signal, the relay 71 is not energized. During the first half cycle of the reference voltage, the end terminal 66 of the secondary winding 63 is positive with respect to the tap 68 and thus the high impedance of the diode 62 permits only a negligible amount of current to flow. During the next half cycle, the end terminal 66 of the secondary winding 63 is negative with respect to the tap 68, but the high impedance of the collector circuit of the transistor 61 permits only a negligible amount of current to flow.

If a control signal in phase with the reference voltage is applied across the input terminals 72 and 73, the terminal 73 will be positive when the end terminal 66 of the secondary winding 63 is positive with respect to the tap 68. Only a negligible amount of current will flow, however, due to the high impedance of the diode 62. During the next half cycle, the input terminal 73 will be positive with respect to the input terminal 72 and the tap 68 of the secondary winding 63 will be positive with respect to the end terminal 66. During this half cycle, the base current flowing in the transistor 61 will reduce the impedance of the transistor collector circuit and a relatively large current will flow from the tap 68 through the emitter collector circuit of the transistor 61, the diode 62, and through the relay 71 to the end terminal 66 and the secondary winding 63. Thus, when the control signal is in phase with the reference voltage, the relay 71 is energized on alternate half cycles of the reference voltage. The condenser 79 shunting the relay 71 prevents the relay from chattering when so energized.

If the control signal is 180° out of phase with the reference voltage, it will have no effect during the half cycle in which the collector current flow is in the high impedance direction of the diode 62 and thus very little current will flow through the relay 71. During the next half cycle, the high impedance of the collector of the transistor 61 will prevent a sizable amount of current from flowing through the relay 71.

The resistance 76 connecting the base of the transistor 61 to the end terminal 67 of the secondary winding 63 of the transformer 64 is operative to provide a temperature stabilizing bias for the transistor 61. As in the circuit shown in Figure 2, this bias is operative to drive the value of collector current to the value of collector current for zero emitter current during the half cycle in which the transistor 61 is operative to control the flow of current through the relay 71.

Figure 4:
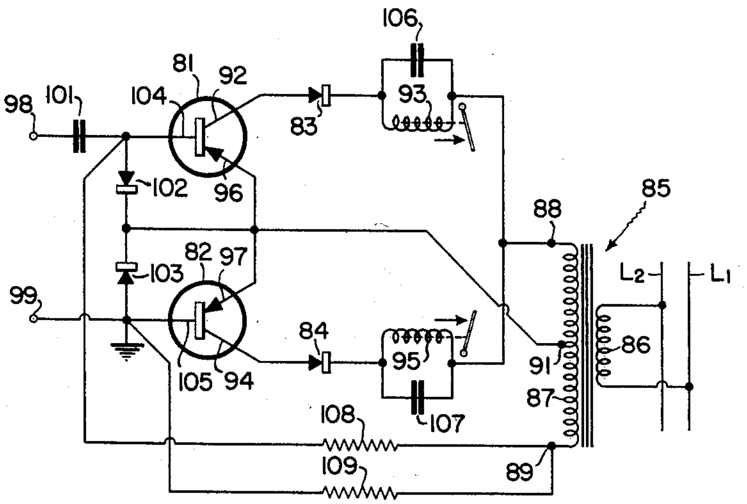
Fig. 4 is a circuit diagram of a temperature stabilized embodiment of the present invention designed to operate a pair of relays selectively in response to the phase relationship between the control signal and the reference voltage.

Referring now to Figure 4 there is shown a modification of the present invention adapted to operate a pair of relays selectively in response to the phase relationship between a control signal and the reference voltage. In this circuit the transistors 81 and 82 and the diodes 83 and 84 are employed as the control elements. The reference voltage is a voltage across the conductors $L_1$ and $L_2$ which is introduced into the circuit by means of the transformer 85 having its primary winding 86 connected across the conductors $L_1$ and $L_2$. The transformer 85 has a secondary winding 87 having end terminals 88 and 89 and a center tap 91. The collector 92 of the transistor 81 is connected through the diode 83 and the relay 93 to the end terminal 88 of the secondary winding 87 of the transformer 85. Similarly the collector 94 of the transistor 82 is connected through the diode 84 and the relay 95 to the end terminal 88 of the secondary winding 87 of the transformer 85. The emitter 96 of the transistor 81 and the emitter 97 of the transistor 82 are connected together and to the center tap 91 of the secondary winding 87 of the transformer 85. The input portion of this circuit includes diodes 102 and 103. The input terminal 98 is connected through the condenser 101 to the base 104 of the transistor 81. The input terminal 99 is connected to the base 105 of the transistor 82 and to ground. The diode 102 is connected between the base and emitter of the transistor 81 and the diode 103 is connected between the base and emitter of the transistor 82. The forward impedance of these diodes is in the direction of positive emitter current. The relays 93 and 95 are shunted by the condensers 106 and 107 respectively. The base 104 of the transistor 81 is connected through the resistor 108 to the end terminal 89 of the secondary winding 87 of the transformer 85. Similarly, the base 105 of the transistor 82 is connected through the resistor 109 to the terminal 89 of the secondary winding 87 of the transformer 85.

The phase discriminating circuit shown in Fig. 4 can be considered as comprising two control circuits of the type shown in Fig. 3. One of these control circuits is adapted to provide relay operation if the control signal is in phase with the reference voltage and the other is adapted to provide relay operation if the control signal is 180° out of phase with the reference voltage. In considering the operation of this circuit, the control signal will be considered to be in phase with the reference voltage when the input terminal 98 has the same instantaneous polarity as the end terminal 88 of the sceondary winding 87 of the transformer 85.

In the absence of a control signal no relay action is provided. During the half cycle of the reference voltage when the end terminal 88 of the secondary winding 87 of the transformer 85 is positive with respect to the center tap 91, the direction of the current flow in both control circuits is in the direction of the high impendance of the diodes 83 and 84 thereby preventing all but a negligible current from flowing. During the next half cycle of the reference voltage, when the end terminal 88 of the secondary winding 87 is negative with respect to the center tap 91 the high impedance of the collector circuits of the transistors 81 and 82 prevent all but negligible current from flowing through the relays. Thus, the diodes 83 and 84 are operative to prevent the relay current from flowing during the half cycle of the reference voltage in which the end terminal 88 of the secondary winding 87 is positive with respect to the center tap 91 and the transistors 81 and 82 prevent relay current from flowing during the half cycle in which the end terminal 88 is negative with respect to the center tap 91.

If a control signal in phase with the reference voltage is applied between the input terminals 98 and 99, the emitter 96 of the transistor 81 will be positive with respect to the base 104 during the half cycle when transistor 81 controls the current flow through the relay 106. During that half cycle, base current will flow in the transistor 81 thereby reducing the impedance of the transistor collector circuit permitting a relatively large current to flow from the center tap 91 of the secondary winding 87 through the emitter collector circuit of the transistor 81 the diode 83, and the relay 93 to the end terminal 88 of the secondary winding 87. During this half cycle, the relay 95 is inoperative since the diode 103 shunts the transistor 82 which acts as though no control signal were present. During the next half cycle of the reference voltage, only a negligible current will flow through the relays 93 and 95 because the direction of current flow is in the direction of the high impedance of the diodes 83 and 84. Thus, if the control signal is in phase with the reference voltage the relay 93 will be energized on alternate half cycles of the reference voltage. The condenser 106 is operative to prevent relay chatter caused by this half cycle energization.

If a control signal 180° out of phase with the reference voltage is applied to the input terminals 98 and 99, the emitter 97 of the transistor 82 will be positive with respect to the base 105 during the half cycle in which the transistor 82 controls the current flow through the relay 95. During that half cycle, base current will flow in the transistor 82 reducing the impedance of the transistor collector circuit thereby permitting a relatively large current to flow from the tap 91 of the secondary winding 87 of the transformer 85 through the emitter collector circuit of the transistor 82, the diode 84 and the relay 95. During this half cycle, the relay 93 is inoperative since the diode 102 shunts the transistor 81 which acts as though no control signal were present. During the next half cycle of the reference voltage only a negligible current will flow through the relays 93 and 95 because the direction of collector current flow is in the direction of the high impedance of the diodes 83 and 84. Thus, if the control signal is 180° out of phase with the reference voltage the relay 95 is energized on alternate half cycles of the reference voltage. The condenser 107 shunting the relay 95 is operative to prevent relay chatter caused by half cycle energization.

Temperature compensation of this circuit is achieved by biasing the bases of the respective transistors so as to drive the value of their collector currents to the value of collector current for zero emitter current during the half cycle in which they control the relay action. To accomplish this, the base 104 of the transistor 81 is connected through the resistance 108 to the end terminal 89 of the secondary winding 87 and the base 105 of the transistor 82 is connected through the resistance 109 to the end terminal 89 of the secondary winding 87. The end terminal 89 of secondary winding 87 will be positive with respect to the tap 91 when the end terminal 88 is negative with respect to the tap 91 and thus will provide the transistors 81 and 82 with the bias necessary for temperature stable operation.

Figure 5:
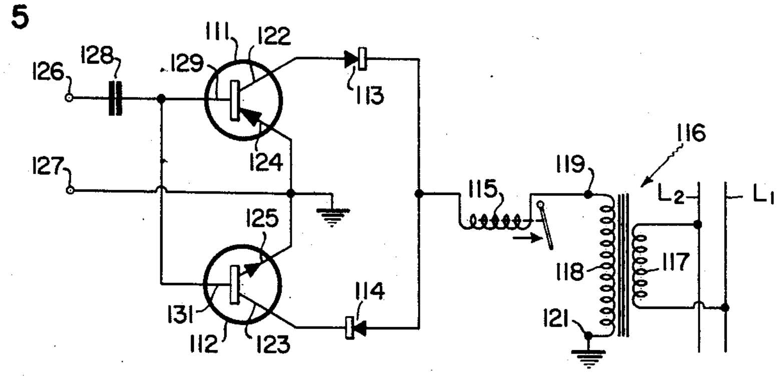
Fig. 5 is a circuit diagram of an embodiment of the present invention in which complementary symmetry is employed to split the control signal into two out of phase signals for relay control.

Fig. 5 is a circuit diagram of an embodiment of the present invention in which complementary symmetry is employed to achieve the necessary circuit operation for phase discriminating relay action. This circuit employs the p-n-p type junction transistor 111, the n-p-n type junction transistor 112, and the diodes 113 and 114 to control the flow of current through the relay 115 in accordance with the phase relationship between an input signal and the reference voltage. The reference voltage in this circuit is the voltage across the conductors $L_1$ and $L_2$ which is introduced in the circuit by means of the transformer 116 which has its primary winding 117 connected across the conductors $L_1$ and $L_2$. The transformer 116 has a secondary winding 118 having end terminals 119 and 121. The collector 122 of the transistor 111 is connected through the diode 113 and through the relay 115 to the end terminal 119 of the secondary winding 118 of the transformer 116. Similarly, the collector 123 of the transistor 112 is connected through the diode 114, the relay 115 to the end terminal 119 of the secondary winding 118. The end terminal 121 of the secondary winding 118 is connected to ground. The emitters 124 and 125 of the transformers 111 and 112 respectively are connected together and are also connected to ground so as to form a closed circuit with the secondary winding 118 of the transformer 116. The input portion of this circuit includes the input terminals 126 and 127 and the coupling condenser 128. The input terminal 126 is connected through the coupling condenser 128 to the base 129 of the transistor 111 and the base 131 of the transistor 112. The input terminal 127 is connected to the emitters 124 and 125 of the transistors 111 and 112 respectively and to ground.

In considering the operation of the circuit shown in Fig. 5, the control signal, applied to the circuit across the input terminals 126 and 127, will be considered to be in phase with the reference voltage when the input terminal 126 has the same instantaneous polarity as the end terminal 119 of the secondary winding 118 of the transformer 116. This circuit can be considered as comprising two control circuits each operative to energize the relay 115 during alternate half cycles of the reference voltage if the control signal is in phase with the reference voltage. In the absence of such a control signal or when the control signal is 180° out of phase with the reference voltage the relay 115 is not energized.

In the absence of a control signal and if the end terminal 119 of the secondary winding 118 of the transformer 116 is positive during the first half cycle of the reference voltage under consideration, very little current will flow in the circuit including the diode 113 because the direction of that current flow is in the high impedance direction of that diode. During that same half cycle, very little current will flow in the circuit including the transistor 112 because of the high impedance of the collector circuit of that transistor. During the next half cycle when the end terminal 121 of the secondary winding 118 of the transformer 116 is positive, very little current will flow in the portion of the circuit including the transistor 111 because of the high impedance of the transistor collector. During that same half cycle, very little current will flow in this portion of the circuit including the diode 114 because the direction of that current flow is in the high impedance direction of that diode.

Due to the assymetrical conduction of the diodes 113 and 114, the transistors 111 and 112 are operative to control the relay current on alternate half cycles of the reference voltage. If a control signal in phase with the reference voltage is applied to the circuit across the input terminals 126 and 127, that signal will be operative to cause base current to flow in the transistors 111 and 112 during the half cycle in which those transistors control the relay current. This transistor base current will reduce the impedance of the respective transistor collector circuits and permit a 60 cycle alternating voltage to be impressed across the relay 115. If a control signal 180° out of phase with the reference voltage is applied to the circuit across the input terminals 126 and 127, base current will flow in the transistors 111 and 112 only during the half cycles in which the diodes 113 and 114 prevents current from flowing through the relay and accordingly the relay will not be energized.

Figure 6:
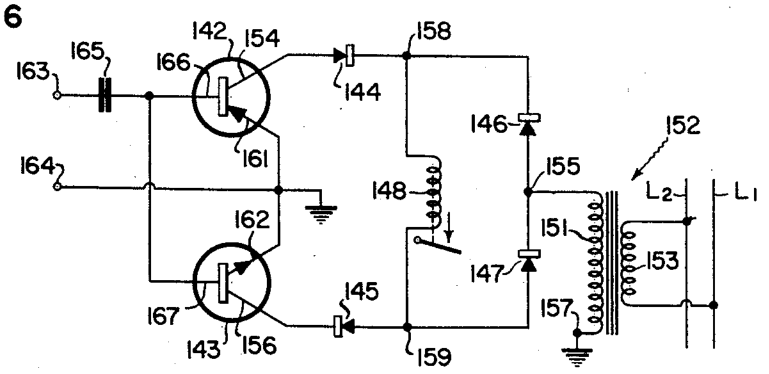
Fig. 6 is a modification of the embodiment of the present invention shown in Fig. 5.

Referring now to Fig. 6, there is shown a circuit diagram of a modification of the present invention as shown in Fig. 5 in which the relay is energized with a pulsating unidirectional current when the control signal is in phase with the reference voltage. This circuit employs the p-n-p type junction transistor 142, the n-p-n type junction transistor 143, and the diodes 144, 145, 146, and 147 to control the current flow through the relay 148. The reference voltage is again the voltage across the conductors $L_1$ and $L_2$ which is introduced into the circuit across the secondary winding 151 of the transformer 152 which has its primary winding 153 connected across the conductors $L_1$ and $L_2$. The collector 154 of the transistor 142 is connected through the diodes 144 and 146, which are connected in opposite directions, to the end terminal 155 of the secondary winding 151 of the transformer 152. Similarly, the collector 156 of the transistor 143 is connected through the diodes 145 and 147, which are connected in opposite directions, to the end terminal 155 of the secondary winding 151. The secondary winding 151 has its other end terminal 157 connected to ground. The relay 148 is connected between the junction point 158 between the diodes 144 and 146 and the junction point 159 between the diodes 145 and 147. The emitters 161 and 162 of the transistors 142 and 143, respectively, are connected together and to ground to form a close close circuit with with the secondary winding 151 of the transformer 152. The input to this circuit is across the input terminals 163 and 164. The input terminal 163 is connected through the coupling condenser 165 to the base 166 of the transistor 142 and to the base 167 of the transistor 143 which are connected together. The input terminal 164 is connected to ground.

In considering the operation of the circuit shown in Fig. 6, a control signal, applied to the circuit across the input terminals 163 and 164, will be considered to be in phase with the reference voltage when the input terminal 163 has the same instantaneous polarity as the end terminal 155 of the secondary winding 151. This circuit can be considered as a full wave bridge rectifier supplying pulsating unidirectional current to the relay 148 when the control signal is in phase with the reference voltage. In the absence of a control signal or when the control signal is 180 degrees out of phase with the reference voltage the relay is not energized.

In the absence of a control signal and if the end terminal 155 of the secondary winding 151 of the transformer 152 is positive during the first half cycle of the reference voltage under consideration, very little current will flow through the relay 148 because of the high impedance of the collector circuit of the transistor 143. During the next half cycle, very little current will flow through the relay 148 because of the high impedance of the collector circuit of the transistor 142. Thus, the transistor 143 is operative to control the current flow through the relay 148 during one half cycle of the reference voltage and the transistor 142 is operative to control the flow of relay current during the next half cycle of the reference voltage. If a control signal in phase with the reference voltage is applied to the circuit, that signal will be operative to cause base current to flow in the transistors 142 and 143 during the respective half cycles in which those transistors control relay current. This transistor base current will reduce the impedance of the respective transistor collector circuits causing the circuit of Fig. 6 to operate as a full wave bridge rectifier. If, on the other hand, a control signal 180 degrees out of phase with the reference voltage is applied to the circuit, this base current will flow in the transistors 163 and 164 during the half cycle when these transistors are not controlling the flow of relay current and thus will be inoperative to reduce the impedance of the respective transistor collector circuits when the current flow therethrough is in their high impedance direction.

While in accordance with the provisions of the statutes, there has been illustrated and described the best forms of the present invention now known, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what is claimed as new and desired to secure by Letters Patent is:

1. A phase discriminating circuit comprising in combination a transistor having a collector, an emitter, and a base, circuit means connecting the emitter and collector of said transistor to an alternating power source so as to form therewith a series circuit, a diode connected in said series circuit for acting as a low impedance in the normal direction of collector current flow and to restrict the current flow in the direction toward the collector of said transistor, a relay connected in said series circuit, a pair of control voltage input terminals for connection to a source of alternating control voltage having a reversible phase with respect to said power source, circuit means including a condenser connecting the base of said transistor to one of said input terminals, circuit means connecting the emitter of said transistor to the other of said input terminals, and a second diode connected between the base and emitter of said transistor and acting as a low impedance path in the direction toward the emitter.

2. Apparatus as specified in claim 1 wherein the base of said transistor is connected to a source of voltage having an instantaneous polarity opposite to that applied by said alternating power source to the collector of said transistor.

3. An alternating current phase discriminating apparatus comprising in combination a pair of transistors each having an emitter, a collector and a base, means connecting the emitters of said transistors together and to a common terminal of an alternating current power source, means connecting the collectors of said transistors to said power source to form a series circuit with said emitters, means responsive to collector current connected in said series circuit, an input circuit having a pair of control voltage input terminals for connection to a source of control voltage, circuit means connecting the base and emitter of each of said transistors to said input circuit, and means including an asymmetrically conductive device connected in series with each of said collectors for acting as a low impedance in the normal direction of controlled collector current flow.

4. A control circuit comprising in combination a transistor having an emitter, a collector, and a base, a source of alternating reference voltage, means connecting said emitter to one terminal of said source, means including a diode and a relay connecting said collector to the other terminal of said source, said means including said diode acting as a low impedance in the normal direction of control collector current flow, a second diode connected between the emitter and base of said transistor and poled to shunt a positive signal away from said base, and an input circuit capacitively coupled to said emitter and base.

5. A phase discriminating apparatus comprising in combination, an alternating current power source, a pair of transistors each having a collector, an emitter, and a base, circuit means connecting the emitters of each of said transistors to one terminal of said power source, circuit means including a diode and a relay connecting the collector of one of said transistors to another terminal of said power source, circuit means including a second diode and a second relay connecting the collector of the other of said transistors to the same terminal of said power source as the collector of the first mentioned transistor, said last named terminal of said power source being 180° out of phase with said first mentioned terminal, said diodes being so connected as to provide a high impedance path in the direction of current flow into said collectors and to act as a low impedance in the normal direction of collector current flow, an input circuit, circuit means connecting the bases of said transistors to said input circuit, circuit means connecting the emitters of said transistors to said input circuit, and circuit means connecting the base of each of said transistors to a source of power 180° out of phase with the source of power to which the collectors of said transistors are connected.

6. An alternating current phase discriminating apparatus comprising, in combination, a transistor having an emitter, a collector, and a base, means connecting said emitter to one terminal of an alternating current power source, means connecting the collector of said transistor to said power source to form a series circuit with said emitter, means responsive to collector current connected in said series circuit, an input circuit having a pair of control voltage input terminals for connection to a source of control voltage, circuit means connecting the base and emitter of said transistor to said input circuit, and means including a diode connected in series with said collector for acting as a low impedance in the normal direction of controlled collector current flow.

References Cited in the file of this patent

UNITED STATES PATENTS

| | | |
|---|---|---|
| 2,524,051 | Goertz | Oct. 3, 1950 |
| 2,629,833 | Trent | Feb. 24, 1953 |
| 2,677,086 | McAdie | Apr. 27, 1954 |
| 2,680,160 | Yaeger | June 1, 1954 |
| 2,691,073 | Lowman | Oct. 5, 1954 |
| 2,695,381 | Darling | Nov. 23, 1954 |
| 2,698,392 | Herman | Dec. 28, 1954 |
| 2,745,021 | Kurshan | May 8, 1956 |
| 2,778,978 | Drew | Jan. 22, 1957 |
| 2,783,384 | Bright et al. | Feb. 26, 1957 |